US006839837B1

(12) United States Patent
Morishita

(10) Patent No.: US 6,839,837 B1
(45) Date of Patent: Jan. 4, 2005

(54) CRYPTOSYSTEM KEY UPDATING SYSTEM AND METHOD FOR PREVENTING ILLEGAL USE OF SOFTWARE

(75) Inventor: Takuya Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/303,561

(22) Filed: May 3, 1999

(30) Foreign Application Priority Data

May 8, 1998 (JP) ............................................ 10-125619

(51) Int. Cl.[7] .............................................. H04L 9/16
(52) U.S. Cl. ....................... 713/164; 713/165; 713/193; 380/44; 380/45
(58) Field of Search ................................ 713/164–167, 713/193; 380/44–45

(56) References Cited

U.S. PATENT DOCUMENTS

| 4,558,176 | A | * | 12/1985 | Arnold et al. .............. 713/190 |
| 4,588,991 | A | * | 5/1986 | Atalla ......................... 713/165 |
| 4,944,008 | A | * | 7/1990 | Piosenka et al. ............. 380/46 |
| 5,003,594 | A | * | 3/1991 | Shinagawa ................... 713/159 |
| 5,699,428 | A | * | 12/1997 | McDonnal et al. ......... 713/165 |
| 5,727,061 | A | * | 3/1998 | Johnson et al. ............. 713/165 |
| 6,012,143 | A | * | 1/2000 | Tanaka ........................ 713/200 |
| 6,131,090 | A | * | 10/2000 | Basso et al. .................. 706/23 |
| 6,141,753 | A | * | 10/2000 | Zhao et al. .................. 713/176 |

FOREIGN PATENT DOCUMENTS

| JP | 3-68024 | 3/1991 |
| JP | 5-27965 | 2/1993 |
| JP | 8-185361 | 7/1996 |

OTHER PUBLICATIONS

Hendry, Mike, Smart Card Security and Applications, Artech House, Inc., 1997, chapters 7, 8.*
Riedel,Erik et al, "A framework for evaluating storage system security", USENIX Association, 2002, Proceedings of the FAST 2002 Conference on File and Storage Technologies, entire document, particularly section 2.3.7.*

* cited by examiner

Primary Examiner—Ayaz Sheikh
Assistant Examiner—Ronald Baum
(74) Attorney, Agent, or Firm—Foley & Lardner LLP

(57) ABSTRACT

A system and method for preventing illegal use of software is provided, which cannot be analyzed by using a software debugger which operates in any mode, and the secret information stored in which cannot be retrieved even if backup data of the secret information is stored in another device. The system comprises a unit for storing secret information; a unit for storing a cryptosystem key used for decrypting the secret information stored in the secret information storage means; a unit for determining whether an illegal access to the system is performed; and a cryptosystem key updating unit for providing the same key for a cryptosystem key used for reencrypting the secret information stored in the secret information storage means and a cryptosystem key which is stored as the updated cryptosystem key in the cryptosystem key storage means if the illegal access determining means detects no illegal access, or providing different keys for the above two kinds of cryptosystem keys if the illegal access determining means detects an illegal access, and wherein the cryptosystem key updating units updates the above two kinds of cryptosystem keys for each access to the system.

9 Claims, 5 Drawing Sheets

US 6,839,837 B1

CRYPTOSYSTEM KEY UPDATING SYSTEM AND METHOD FOR PREVENTING ILLEGAL USE OF SOFTWARE

BACKGROUND OF THE INVENTION

1. Field of the Invention

The present invention relates to a system and method for preventing illegal use of software, in particular, a system for preventing an illegal user from decrypting secret information stored in an IC card or the like, which is distributed to a general user.

This application is based on Patent Application No. Hei 10-125619 filed in Japan, the contents of which are incorporated herein by reference.

2. Description of the Related Art

When an IC card for medical use stores software including secret information concerning patients, t is necessary to prevent a third party from decrypting such secret information and illegally using it.

For example, there are two conventional systems used for preventing illegal use of software:

FIG. 5 is a diagram showing the first conventional system for keeping the control program in the operating system (OS) for a microcomputer (i.e., a semiconductor integrated circuit) secret (refer to Japanese Patent Application, First Publication, No. Hei 8-185361).

In FIG. 5, microcomputer 1 includes a system memory (i.e., storage means) 2, a rewritable and nonvolatile memory, in which a control program such as the Kernel in the OS is stored. The system memory 2 stores (i) decrypting key FK used for decrypting data such as an encrypted control program based on a specific decrypting algorithm, and (ii) decrypting-process information FT which includes a program for executing the decrypting algorithm by using the decrypting key FK. The decrypting key FK and decrypting-process information FT are stored in the system memory 2; thus, a user can rewrite this data as the user chooses.

There are two types of the applicable cryptosystems, a symmetrical cryptosystem in which encrypting and decrypting operations are performed using the same key, and an asymmetrical cryptosystem in which encrypting and decrypting operations are performed using different keys. Either system can be used in the system of FIG. 5. In the encrypting and decrypting operations, a reversible operation such as exchange or inversion in a specific bit sequence is controlled using a key.

The microcomputer 1 also comprises input/output circuit 3 for inputting or outputting data via external bus Bg, and RAM 4 for storing specific data input from the input/output circuit 3. The microcomputer 1 further comprises CPU (central processing unit) 5 which controls all the operations of the microcomputer 1. Decoding means FS in this system consists of CPU 5, decrypting key FK, and decrypting-process information FT. The system memory 2, input/output circuit 3, RAM 4, and CPU 5 are connected with each other via an internal bus 6.

The conventional system (for preventing illegal use of software) having the above structure employs the following method for protecting secret information from an illegal user.

In this system, a function of CPU 5 for protecting commands and data is used. The system memory 2 can be accessed only in the supervisor mode. Therefore, generally, secret information stored in the system memory 2 cannot be retrieved by a general user.

The second conventional system for preventing illegal use employs a dedicated device or means for storing secret information, and has the function of physically destroying the dedicated device when an illegal user tries to physically analyze the system.

However, the above first and second illegal-use preventing systems have the following problems.

The problem caused by the first system is that secret information cannot be completely protected by the relevant software. The reason is that the secret-information protecting means in the first system only inhibits an access in a mode other than the supervisor mode; thus, if an illegal user tries to perform an analysis using a software debugger which is operated in the supervisor mode, the protection of secret information is ineffective.

The problem caused by the second system is that if such a dedicated means is wholly constructed using software, secret information itself must be stored in a general file storage device. In this case, the secret information can also be stored in another file storage device as a backup copy. Therefore, if an illegal user stores backup data of secret information in another file storage device in advance, it is easy to restore the backup data even if secret information stored in the main file storage system is destroyed.

SUMMARY OF THE INVENTION

In consideration of the above circumstances, an objective of the present invention is to provide a system and method for preventing illegal use of software, which cannot be analyzed by using a software debugger which operates in any mode, and secret information stored in which cannot be retrieved even if backup data of the secret information is stored in another device.

Therefore, the present invention provides a system for preventing illegal use of software, comprising:
  secret information storage means for storing secret information;
  cryptosystem key storage means for storing a cryptosystem key used for decrypting the secret information stored in the secret information storage means;
  illegal access determining means for determining whether an illegal access to the system is performed; and
  cryptosystem key updating means for:
    providing the same key for a cryptosystem key used for reencrypting the secret information stored in the secret information storage means and a cryptosystem key which is stored as the updated cryptosystem key in the cryptosystem key storage means if the illegal access determining means detects no illegal access;
    providing different keys for the above two kinds of cryptosystem keys if the illegal access determining means detects an illegal access; and
  wherein the cryptosystem key updating means updates the above two kinds of cryptosystem keys for each access to the system.

The present invention also provides a method and a storage medium storing a computer-executable program, which correspond to the above system.

In the present invention, the illegal access determining means (for detecting an illegal operation) is provided. If an illegal user who accesses the system tries to decrypt the secret information stored in the secret information storage means, the secret information cannot be accurately decrypted, while a legal user who accesses the system can decrypt the encrypted secret information stored in the secret information storage means by performing a specific operation necessary for the decryption. That is, from the second access, the secret information cannot be decrypted, and it is possible to prevent an illegal user from retrieving secret information used in a software by analyzing the system by using a software debugger or by falsifying the software.

In addition, the secret information storage means and the cryptosystem key storage means may be separately constructed. In this case, backup data of the secret information and the cryptosystem key can be stored, for example, in different file storage devices. As different cryptosystem keys are provided by the cryptosystem key updating means when an illegal operation is detected, even if an illegal user restores the secret information after the system becomes abnormal due to an illegal operation, normal operation using correct secret information becomes impossible.

DESCRIPTION OF THE PREFERRED EMBODIMENTS

Hereinafter, an embodiment of the present invention will be explained with reference to the drawings.

(1) Structure of the embodiment

Figure 1:
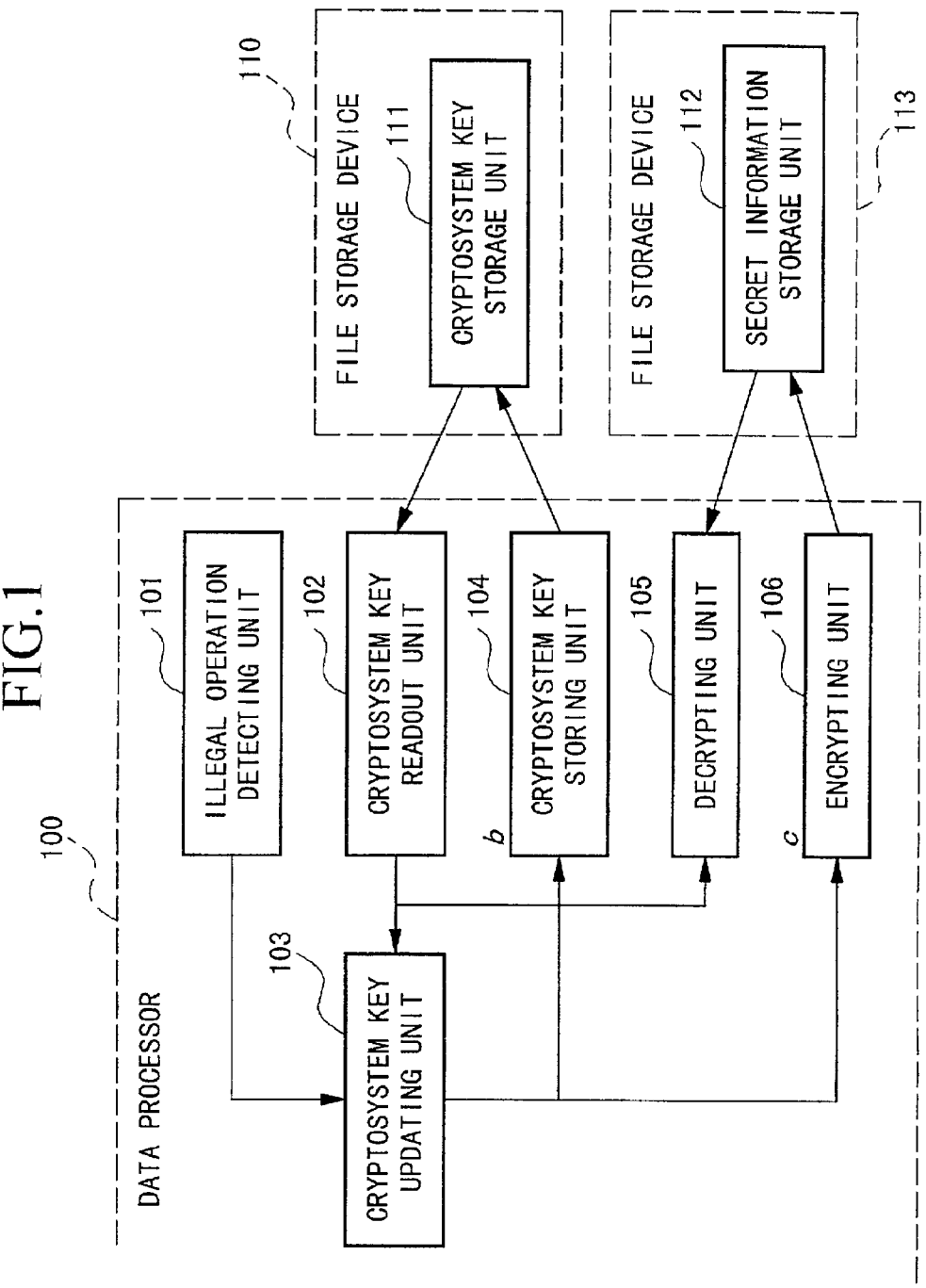
FIG. 1 is a block diagram showing the system arrangement as an embodiment according to the present invention.

FIG. 1 is a block diagram showing the structure of the system for preventing illegal use of software in the present embodiment.

As shown in FIG. 1, the system of the present embodiment comprises program-controlled data processor 100, and file storage devices 110 and 113.

The data processor 100 includes illegal operation detecting unit 101 functioning as the illegal access determining means of the present invention, cryptosystem key readout unit 102, cryptosystem key updating unit 103, cryptosystem key storing unit 104, decrypting unit 105, and encrypting unit 106. The operations of these units will be explained later.

The file storage device 113 includes secret information storage unit 112 for storing encrypted secret information, and the file storage device 110 includes cryptosystem key storage unit 111 for storing a cryptosystem key necessary for decrypting the encrypted secret information stored in the secret information storage unit 112. Here, the cryptosystem key storage unit 111 and the secret information storage unit 112 are respectively stored in different file storage devices so as to prevent an illegal user from retrieving the cryptosystem key and the secret information in a single operation. That is, in the present system, two backup operations are necessary for storing backup data of the cryptosystem key and the secret information.

The operations of the above units 101 to 106 will be explained below.

The illegal operation detecting unit 101 detects whether an illegal user who wants secret information (for example, a secret key used in a secret-key cryptosystem or an encrypting algorithm itself) tries to read out the secret information (the practical method will be explained later). If it is detected that such an illegal try is performed, the illegal operation detecting unit 101 informs the cryptosystem key updating unit 103 (explained below) of the detected result.

The cryptosystem key readout unit 102 reads out cryptosystem key a for decrypting secret information from the cryptosystem key storage unit 111.

The cryptosystem key updating unit 103 updates the cryptosystem key in a specific operation depending on the situation (explained below), and sends the updated key to the cryptosystem key storing unit 104 and the encrypting unit 106.

That is, if an illegal try for reading out the secret information has been detected by the illegal operation detecting unit 101, the cryptosystem key updating unit 103 sends completely different cryptosystem keys b and c to the cryptosystem key storing unit 104 and the encrypting unit 106 (i.e., cryptosystem key b=cryptosystem key c). In the normal operation (when no illegal try for reading out the secret information is performed), the cryptosystem key updating unit 103 sends the same key as the cryptosystem keys b and c, to the cryptosystem key storing unit 104 and the encrypting unit 106 (i.e., cryptosystem key b=cryptosystem key c).

The cryptosystem key storing unit 104 stores the new cryptosystem key b, updated by the cryptosystem key updating unit 103, into the cryptosystem key storage unit 111.

The decrypting unit 105 reads out the encrypted secret information from the secret information storage unit 112, and decrypts the secret information using the cryptosystem key a read out by the cryptograph-key readout unit 102 so as to obtain the secret information necessary for performing specific operations of the system.

The encrypting unit 106 reencrypts the secret information (decrypted by the decrypting unit 105) by using new cryptosystem key c updated by the cryptosystem key updating unit 103, and stores the reencrypted secret information into the secret information storage unit 112.

(2) Operation the operations of the present embodiment will be explained in detail with reference to the above FIG. 1 and the flowchart shown in FIG. 2.

Figure 2:
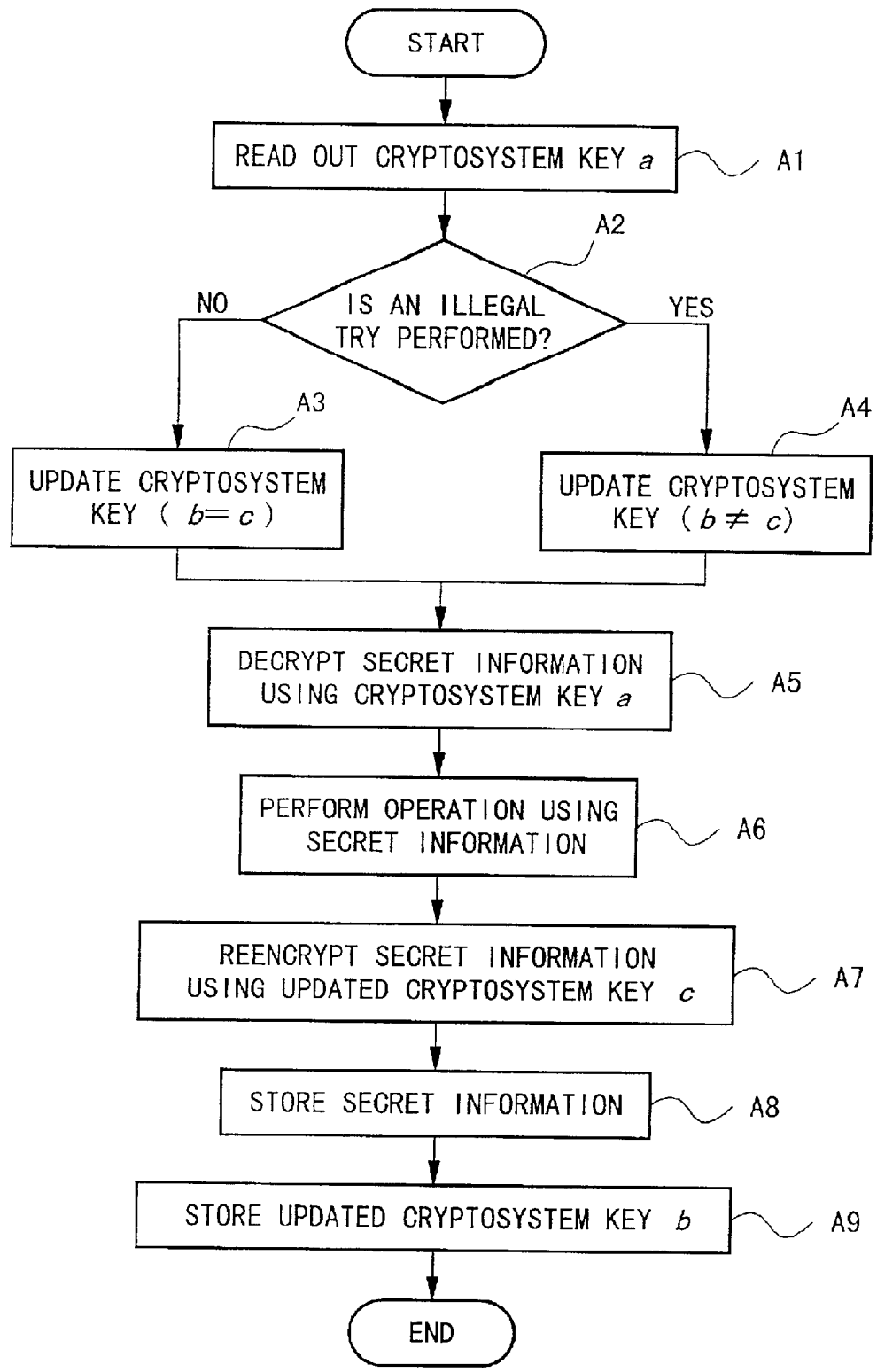
FIG. 2 is a flowchart showing the operations of the embodiment.

First, cryptosystem key readout unit 102 reads out cryptosystem key a from the cryptosystem key storage unit 111 (see step A1 in FIG. 2).

Next, illegal operation detecting unit 101 detects whether an illegal user who wants secret information tries to read out the secret information (see step A2). In this detection, for example, it is examined whether an illegal user falsifies the present system (for preventing illegal use of software) operating in the data processor 100. Such an examination is performed by, for example, detecting a falsifying operation using electronic signatures and secret-key encryption. Simultaneously, a program-analyzing operation using a software debugger is also detected.

The cryptosystem key updating unit 103 updates the cryptosystem key for reencrypting the secret information (see step A3 or A4).

That is, if no illegal operation is detected by the illegal operation detecting unit 101 in step A2 (i.e., the detection result is "NO"), the cryptosystem key updating unit 103 provides the same key for (i) cryptosystem key b stored by the cryptosystem key storing unit 104 into the cryptosystem key storage unit 111 and (ii) cryptosystem key c used by the encrypting unit 106 for reencrypting the secret information (i.e., cryptosystem key b=cryptosystem key c) (see step A3).

On the other hand, if an illegal operation is detected in step A2 (i.e., the detection result is "YES"), the cryptosystem key updating unit 103 provides completely different keys as cryptosystem keys b and c (i.e., cryptosystem key b=cryptosystem key c) (see step A4).

In the cryptosystem-key updating operation performed by the unit 103, a one-direction function or a pseudo-random number is used for generating a new cryptosystem key so that cryptosystem keys a and c are not easily calculated or determined with reference to cryptosystem key b.

The decrypting unit 105 reads out the encrypted secret information from the secret information storage unit 112, and decrypts the information using the cryptosystem key a read out by the cryptosystem key readout unit 102 so that non-encrypted original secret information is retrieved (see step A5). Therefore, an operation using the secret information, such as a transaction-authenticating operation using the secret-key encryption, is performed (see step A6).

The encrypting unit 106 reencrypts the secret information, which was decrypted by the decrypting unit 105, by using the cryptosystem key c updated by the cryptosystem key updating unit 103 (see step A7), and stores the reencrypted secret information into the secret information storage unit 112 (see step A8).

The cryptosystem key storing unit 104 stores the cryptosystem key b updated by the cryptosystem key updating unit 103 into the cryptosystem key storage unit 111 (see step A9).

(3) Example

Below, an example according to the present embodiment will be explained with reference to FIGS. 3 and 4.

Figure 3:
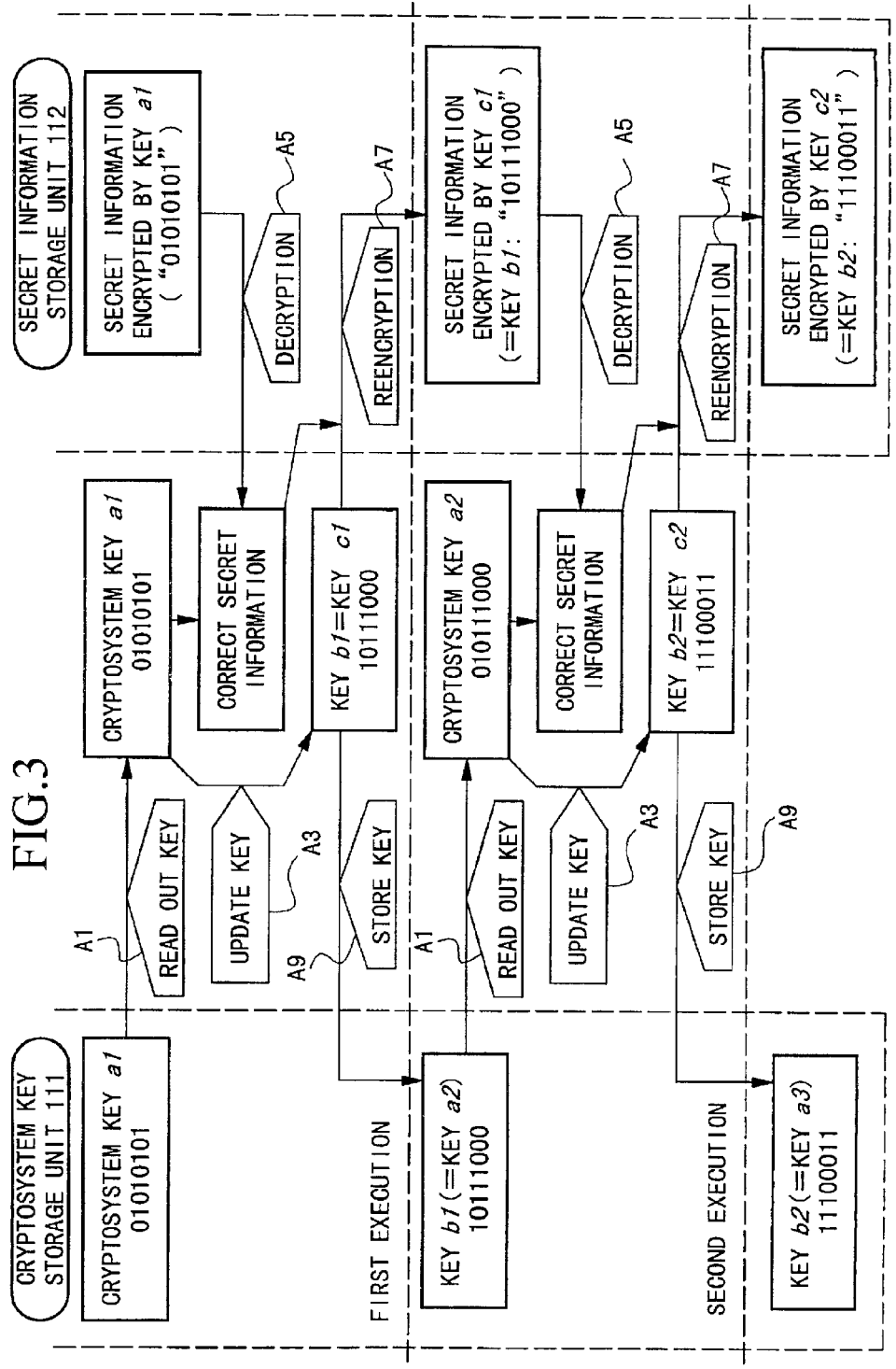
FIG. 3 is a diagram explaining the operations executed when normal access is performed.

(3-1) When no illegal try is performed:

FIG. 3 is a diagram explaining the operations executed when no illegal try is performed by an illegal user.

As shown in FIG. 3, initial cryptosystem key a1 (whose code (value) is "01010101") may be stored in the cryptosystem key storage unit 111, and secret information encrypted using the cryptosystem key a1 is stored in the secret information storage unit 112. Here, the code length of the cryptosystem key is 8 bits for ease of explanation. However, actually, a key consisting of a much longer code (generally, a few ten to a few thousand of bits) is used according to the strength of the encryption algorithm.

In step A1 in the first execution, the cryptosystem key readout unit 102 reads out cryptosystem key a1 from the cryptosystem key storage unit 111. Here, no illegal try is detected in step A2; thus, new cryptosystem keys b1 and c1 (which were updated in step A3) are the same (i.e., "10111000"), as described above (i.e., cryptosystem key b1 cryptosystem key c1). The decrypting unit 105 decrypts the secret information using the first cryptosystem key a1 (see step A5). The encrypting unit 106 reencrypts the decrypted secret information by using updated cryptosystem key c1 (" 10111000") (see step A7). In addition, the cryptosystem key storing unit 104 stores the updated cryptosystem key b1 ("10111000") into the cryptosystem key storage unit 111 (see step A9).

In step A1 in the second execution, the cryptosystem key readout unit 102 reads out cryptosystem key b1 (=cryptosystem key a2: "10111000") which was stored into the cryptosystem key storage unit 111 in the step S9. The decrypting unit 105 decrypts the encrypted secret information (stored in the secret information storage unit 112) by using this cryptosystem key a2 (see step A5). The secret information to be decrypted was encrypted in the first execution by using cryptosystem key c1 (=cryptosystem key b1: "10111000"). As the cryptosystem keys a2 and c1 have the same code value ("10111000"), the decrypting operation is accurately performed so that correct secret information can be obtained.

Similar operations are performed from the third execution and the cryptosystem key for encrypting the secret information is updated for each execution, and correct secret information can be obtained in each execution.

Figure 4:
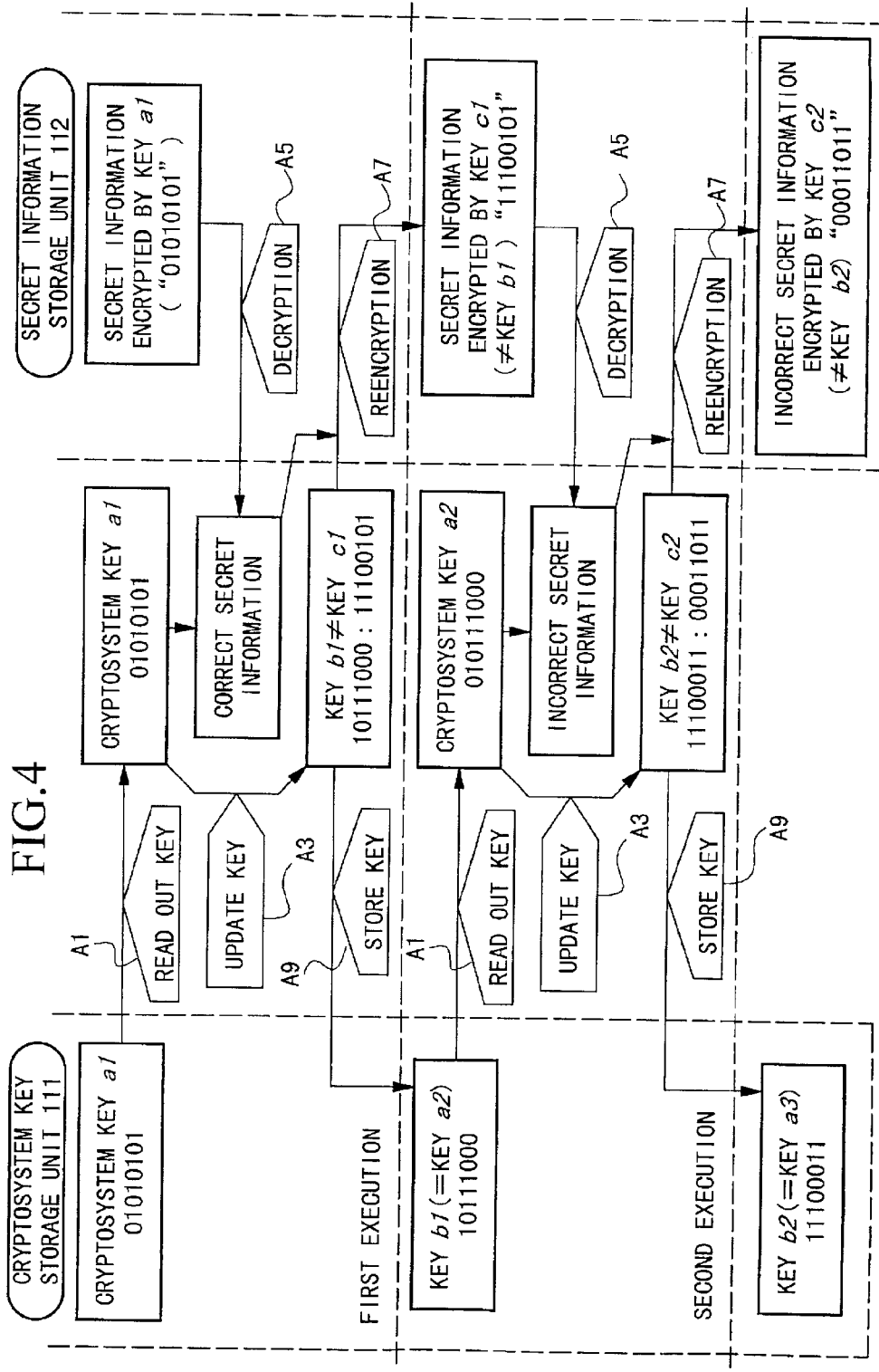
FIG. 4 is a diagram explaining the operations executed when illegal access is attempted by an illegal user.
Figure 5:
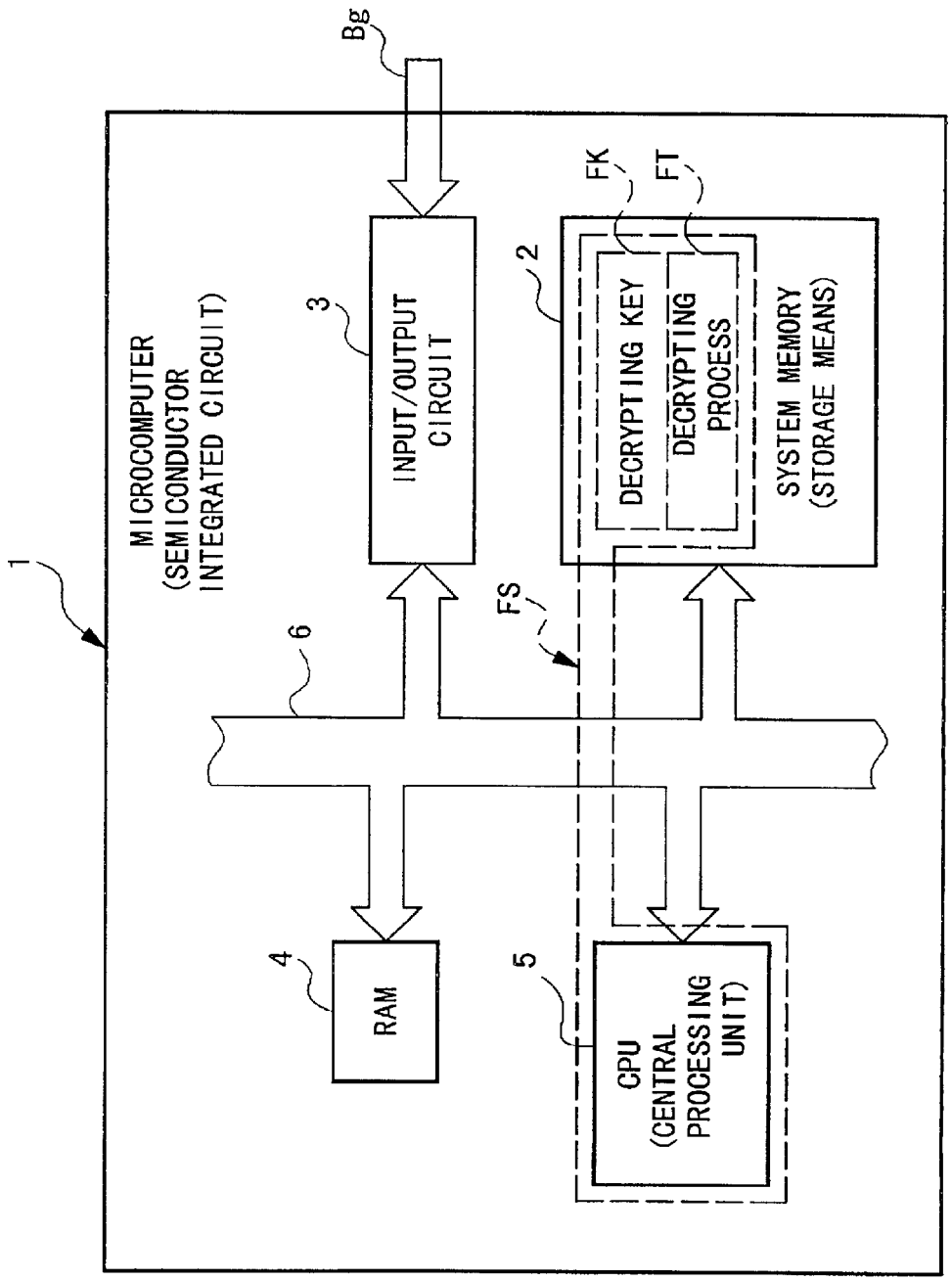
FIG. 5 is a block diagram showing an example of the conventional system for preventing illegal use of software.

(3-2) When an illegal try is performed:

FIG. 4 is a diagram explaining the operations executed when an illegal try is performed by an illegal user.

As shown in FIG. 4, initial cryptosystem key a1 (whose code (value) is "01010101") may be stored in the cryptosystem key storage unit 111, and secret information encrypted using the cryptosystem key a1 is stored in the secret information storage unit 112.

In step A1 in the first execution, the cryptosystem key readout unit 102 reads out cryptosystem key a1. Here, an illegal try is detected in step A2; thus, new cryptosystem keys b1 and c1 (which were updated in step A3) have different code values (i.e., "10111000" and "11100101") (i.e., cryptosystem key b1 ≠cryptosystem key c1).

The decrypting unit 105 decrypts the secret information using the first cryptosystem key a1 (see step A5). The encrypting unit 106 reencrypts the decrypted secret information by using the updated cryptosystem key c1 ("11100101") (see step A7). In addition, the cryptosystem key storing unit 104 stores the updated cryptosystem key b1 ("10111000") into the cryptosystem key storage unit 111 (see step A9).

In step A1 in the second execution, the cryptosystem key readout unit 102 reads out cryptosystem key a2 ("10111000"). The decrypting unit 105 decrypts the secret information, stored in the cryptosystem key storage unit 111, by using this cryptosystem key a2 (see step A5). The secret information to be decrypted was encrypted in the first execution by using the cryptosystem key c1 ("11100101"). Here, cryptosystem keys a2 and c1 have different code values ("10111000" and "11100101"); thus, decryption cannot be accurately performed and the obtained secret information is not correct.

In order for an illegal user to obtain correct secret information after this phase, the illegal user must know the code value "11100101" of the cryptosystem key c1. As this value is not stored in the file storage unit 110, it is necessary to try any possible value for the cryptosystem key. The above illegal-use preventing method can have an effect or strength sufficient for practical use though it depends on the encrypting algorithm and the code length of the key.

Before the first execution, the secret information which was encrypted by the cryptosystem key a1 ("01010101") stored in the cryptosystem key storage unit 111 may be stored in another file storage device as backup data in advance. However, in the above situation in which the obtained secret information is not correct, even though the encrypted secret information can be restored, it is difficult to retrieve the correct secret information because the code value of the cryptosystem key a1 is lost in this phase.

If the code value of cryptosystem key a1 stored in the cryptosystem key storage unit 111 is also stored in another file storage device before the first execution, the retrieval of the secret information is not impossible. However, such a detailed system structure can be known by an illegal user only via an illegal analysis using a software debugger (that is, via an illegal try detected by the illegal-operation detecting unit 101).

From the third execution (of the steps in the flowchart of FIG. 2), similar operations are performed and the correct secret information cannot be obtained. When such execution is repeated, encrypting and decrypting operations are performed using a different cryptosystem key for each execution; thus, retrieval of the secret information becomes very difficult.

The present invention is suitably applicable to IC cards which are distributed to many persons in general. In another application, the present invention can be used when distributing software or microcomputers (such as semiconductor integrated circuits) using secret information (a secret key for authentication) which relate to electronic transactions and thus should be secret to third parties.

What is claimed is:

1. A cryptosystem key updating system for preventing illegal use of software, comprising encryption encryption means for encrypting secret information;

secret information storage means for storing the secret information;

cryptosystem key storage means for storing a cryptosystem key used for decrypting the secret information stored in the secret information storage means;

illegal access determining means for determining whether an illegal access to the system is performed; and cryptosystem key updating means for:

providing the updated same key for a first cryptosystem key used for reencrypting the secret information stored in the secret information storage means and a second cryptosystem key which is stored as an updated cryptosystem key in the cryptosystem key storage means if the illegal access determining means detects no illegal access;

providing different keys for the first and second cryptosystem keys if the illegal access determining means detects an illegal access; and wherein the cryptosystem key updating means updates the first and second cryptosystem keys for each access to the system, and subsequently reencrypts the secret information stored in the secret information storage means using the updated first cryptosystem key.

2. A cryptosystem key updating method for preventing illegal use of software, the method used in a system which comprises a means for encrypting secret information; secret information storage means for storing the secret information and a cryptosystem key storage means for storing a cryptosystem key used for decrypting the secret information stored in the secret information storage means, the method comprising the steps of:

determining whether an access to the system is performed, and for each access to the system, providing the same updated key for a first cryptosystem key used for reencrypting the secret information stored in the secret information storage means and a second cryptosystem key which is stored as an updated cryptosystem key in the cryptosystem key storage means if no illegal access is detected in the step of determining whether an illegal access to the system is performed;

providing different updated keys for the first and second cryptosystem keys if an illegal access is detected in the step of determining whether an illegal access to the system is performed; and subsequently reencrypting the secret information stored in the secret information storage means using the updated first cryptosystem key.

3. A storage medium storing a computer-executable cryptosystem key updating program for preventing illegal use of software, the program used in a system which comprises means for encrypting secret information; a secret information storage means for storing secret information and a cryptosystem key storage means for storing a cryptosystem key used for decrypting the secret information stored in the secret information storage means, the program including the processes of:

determining whether an illegal access to the system is performed; and for each access to the system, providing the same updated key for a first cryptosystem key used for reencrypting the secret information stored in the secret information storage means and a second cryptosystem key which is stored as an updated cryptosystem key in the cryptosystem key storage means if no illegal access is detected in the step of determining whether an illegal access to the system is performed;

providing different updated keys for the first and second cryptosystem keys if an illegal access is detected in the step of determining whether an illegal access to the system is performed; and subsequently reencrypting the secret information stored in the secret information storage means using the updated first cryptosystem key.

4. A cryptosystem key updating system for preventing illegal use of software as claimed in claim 1, wherein the secret information storage means and the cryptosystem key storage means are separately constructed.

5. A cryptosystem key updating method for preventing illegal use of software as claimed in claim 2, wherein the secret information storage means and the cryptosystem key storage means are separately constructed.

6. A storage medium storing a computer-executable cryptosystem key updating program for preventing illegal use of software as claimed in claim 3, wherein the secret information storage means and the cryptosystem key storage means are separately constructed.

7. A cryptosystem key updating system for preventing illegal use of software as claimed in claim 1, wherein the system is applied to an IC card.

8. A cryptosystem key updating method for preventing illegal use of software as claimed in claim 2, wherein the system in which the method is used is applied to an IC card.

9. A storage medium storing a computer-executable cryptosystem key updating program for preventing illegal use of software as claimed in claim 3, wherein the system in which the program is used is applied to an IC card.

* * * * *